(12) United States Patent
Cai et al.

(10) Patent No.: US 11,884,831 B2
(45) Date of Patent: Jan. 30, 2024

(54) PHOTOCHROMIC INKJET INKS AND METHODS OF MAKING PHOTOCHROMIC INKJET INKS FOR SECURITY PRINTING APPLICATIONS

(71) Applicant: TROY GROUP, INC., Costa Mesa, CA (US)

(72) Inventors: Xiaorong Cai, Mount Pleasant, SC (US); Michael R. Riley, Steubenville, OH (US)

(73) Assignee: TROY GROUP, INC., Costa Mesa, CA (US)

( * ) Notice: Subject to any disclaimer, the term of this patent is extended or adjusted under 35 U.S.C. 154(b) by 651 days.

(21) Appl. No.: 16/695,757

(22) Filed: Nov. 26, 2019

(65) Prior Publication Data
US 2020/0165478 A1   May 28, 2020

Related U.S. Application Data

(60) Provisional application No. 62/772,495, filed on Nov. 28, 2018.

(51) Int. Cl.
*C09D 11/50* (2014.01)
*C09D 11/328* (2014.01)
(Continued)

(52) U.S. Cl.
CPC ........... *C09D 11/50* (2013.01); *C09D 11/102* (2013.01); *C09D 11/106* (2013.01);
(Continued)

(58) Field of Classification Search
CPC ......... C09D 11/50; C09D 11/17; C09D 11/00; C09D 11/38; C09D 11/328; C09D 11/32; A61K 8/37; A61Q 1/025; B41M 3/144
See application file for complete search history.

(56) References Cited

U.S. PATENT DOCUMENTS 6,830,646 B2 * 12/2004 Patil .................... C08G 59/687
156/335
2004/0220298 A1   11/2004 Kozee et al.
(Continued)

FOREIGN PATENT DOCUMENTS

WO  WO 2018/035514   2/2018
WO  WO 2018/172318   9/2018

OTHER PUBLICATIONS

PCT International Search Report and Written Opinion, US Receiving Office, PCT/US19/63216, dated Feb. 7, 2020, 21 pages

*Primary Examiner* — John Zimmermann
(74) *Attorney, Agent, or Firm* — SNELL & WILMER LLP (57) ABSTRACT

Method of making color changing inkjet inks for security printing applications use photochromic materials that cause the inkjet ink to print marks that are colorless under ambient light and appear in a color when exposed to sunlight or UV light (covert). In another embodiment, the printed mark appears in a first color under ambient light, and changes to a second color when exposed to sunlight or UV light (overt). The methods of making the photochromic inks produce ink components that are stable and maintain their color changing capability for the shelf life of the printed material. The inkjet ink formulations are suitable for use on porous and non-porous surfaces, such as plain paper, coated paper, Teslin, polymer film, ceramic or metal, for example.

29 Claims, 4 Drawing Sheets

(51) Int. Cl.
*C09D 11/102* (2014.01)
*C09D 11/38* (2014.01)
*C09D 11/106* (2014.01)
*C09D 11/36* (2014.01)

(52) U.S. Cl.
CPC ............ *C09D 11/328* (2013.01); *C09D 11/36* (2013.01); *C09D 11/38* (2013.01)

(56) References Cited

U.S. PATENT DOCUMENTS

| | | | |
|---|---|---|---|
| 2005/0279235 A1* | 12/2005 | Barthram | B41M 3/144 |
| | | | 101/483 |
| 2006/0228643 A1* | 10/2006 | Hauck | B41C 1/1008 |
| | | | 430/165 |
| 2008/0102049 A1* | 5/2008 | McDermott | A61K 8/4913 |
| | | | 525/440.03 |
| 2012/0269752 A1* | 10/2012 | Ozee | A61K 8/585 |
| | | | 424/653 |
| 2013/0177703 A1 | 7/2013 | Clayton et al. | |
| 2014/0158019 A1 | 6/2014 | Orellana Moraleda et al. | |
| 2015/0153479 A1* | 6/2015 | Iftime | C09D 11/50 |
| | | | 252/586 |
| 2018/0030289 A1 | 2/2018 | Jarvis et al. | |
| 2018/0259799 A1* | 9/2018 | Kroon | G02F 1/1323 |
| 2021/0259940 A1* | 8/2021 | Arafeh | A61K 8/37 |

* cited by examiner

PHOTOCHROMIC INKJET INKS AND METHODS OF MAKING PHOTOCHROMIC INKJET INKS FOR SECURITY PRINTING APPLICATIONS

CROSS REFERENCE TO RELATED APPLICATIONS

This application claims the benefits of provisional application Ser. No. 62/772,495, filed Nov. 28, 2018 for Method and Process of Making Photochromic Inkjet Inks and is incorporated by reference herein.

BACKGROUND OF THE INVENTION

1. Field of the Invention

The present invention relates to color changing inks and methods of making solvent based inkjet inks that exhibit color changes upon exposure to sunlight t or UV light.

2. Description of Related Art

Invisible inks have been used for printing marks on documents. The marks are normally invisible to the human eye but become visible upon exposure to activating radiation, such as sunlight or UV light. These invisible inks are typically used for printing secure documents, for the purpose of detecting or preventing forgery or counterfeiting. Invisible inks have also been used for printing package labels and labels for medicines, for example. The marks printed by these invisible inks disappear almost immediately after the UV light or sunlight is no longer illuminating the printed marks.

A well-known application for reversible photochromic material is color changing lenses, used for sunglasses or eye glasses, for example. Photochromic materials have also been used in the manufacture of printing inks for the purpose of printing documents and package labels. These photochromic inks are used to print an invisible mark or marks on the document, label or packaging substrate. The printed mark only becomes visible when exposed to sunlight or UV light. Once the mark is no longer eliminated by sunlight or UV light, it stays visible for only a short time period and reverts back to its normal, invisible state.

One problem with these photochromic inks is that they lose their ability to provide the color changing characteristics over time, or as a result of exposure to environmental conditions, such as heat or long-time exposure to UV light. The inkjet inks of the present invention overcome this problem in that they are a stable photochromic ink formulation that maintains its photochromic feature over the course of the anticipated shelf life of the printed document.

SUMMARY OF THE INVENTION

The photochromic inkjet inks are either covert, the printed ink is colorless in ambient light and changes to a visible color under sunlight or UV light, or overt, the printed ink is a visible first color in ambient light and changes to a visible second different color under sunlight or UV light. The covert or overt color changing inkjet inks are made for printing on porous or non-porous substrates. The formulation and methods of making the covert and overt photochromic inkjet inks produce an inkjet ink having stable photochromic characteristics.

BRIEF DESCRIPTION OF THE DRAWINGS

The exact nature of this invention, as well as its objects and advantages, will become readily apparent and be appreciated as the invention becomes better understood by reference to the following detailed description when considered in conjunction with the accompanying drawings, in which like referenced numerals designate like parts throughout the figures thereof, and wherein.

DETAILED DESCRIPTION OF THE PREFERRED EMBODIMENTS

A method of making an inkjet ink according to the formulation of the present invention creates an inkjet ink that has novel color changing characteristics. These color changing characteristics have important applications to the printing of secure documents. In one embodiment, the process uses a photochromic material which produces a colorless mark under ambient light when printed. In another embodiment, the printed mark has a color under ambient light. When a visible color mark is printed on a substrate, such as a secure document or package labels, exposure to sunlight or UV light, will cause a change in color from the original printed mark to a different color. When the marks are printed as colorless, or invisible to the eye, the marks change to a visible color upon exposure to sunlight or UV light. The marks revert back to their original color state when the light source is removed. The photochromic inks of the present invention are usable on porous or non-porous substrates, with equal effect.

Figure 1:
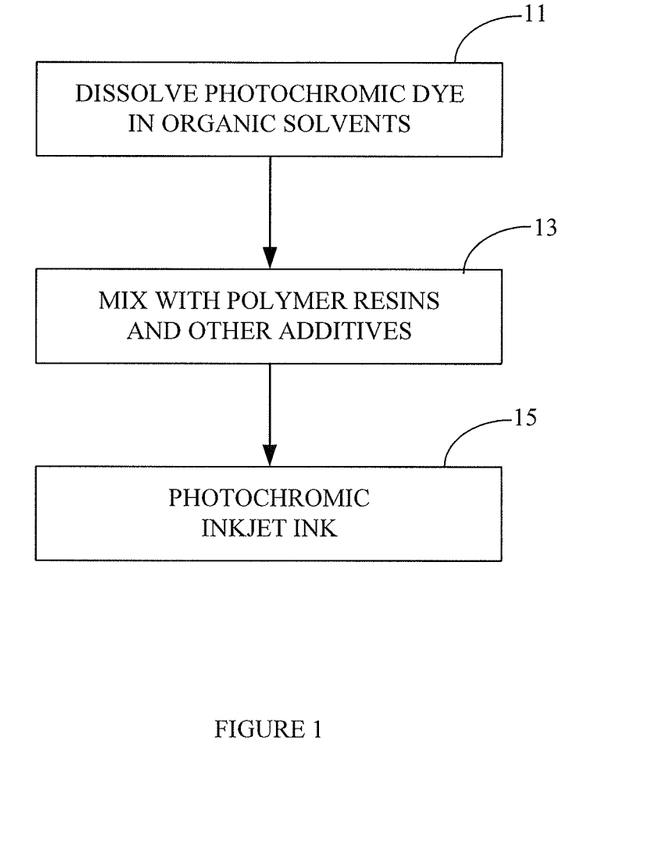
FIG. 1 is a block diagram of process steps for making an embodiment of photochromic inkjet ink according to the present invention.

FIG. 1 illustrates a preferred method of making the photochromic inkjet ink which prints a mark on a substrate that is not visible to the human eye, but changes to a visible color when exposed to sunlight or UV light. This type of ink is called a "covert" ink.

This covert ink is made by dissolving photochromic dye in an organic solvent (11). The solution containing the dissolved photochromic dye is mixed with polymer resins and other additives (13). The additives are used, as needed, to form a photochromic inkjet ink that is printable on either porous or non-porous surfaces (15).

Figure 2:
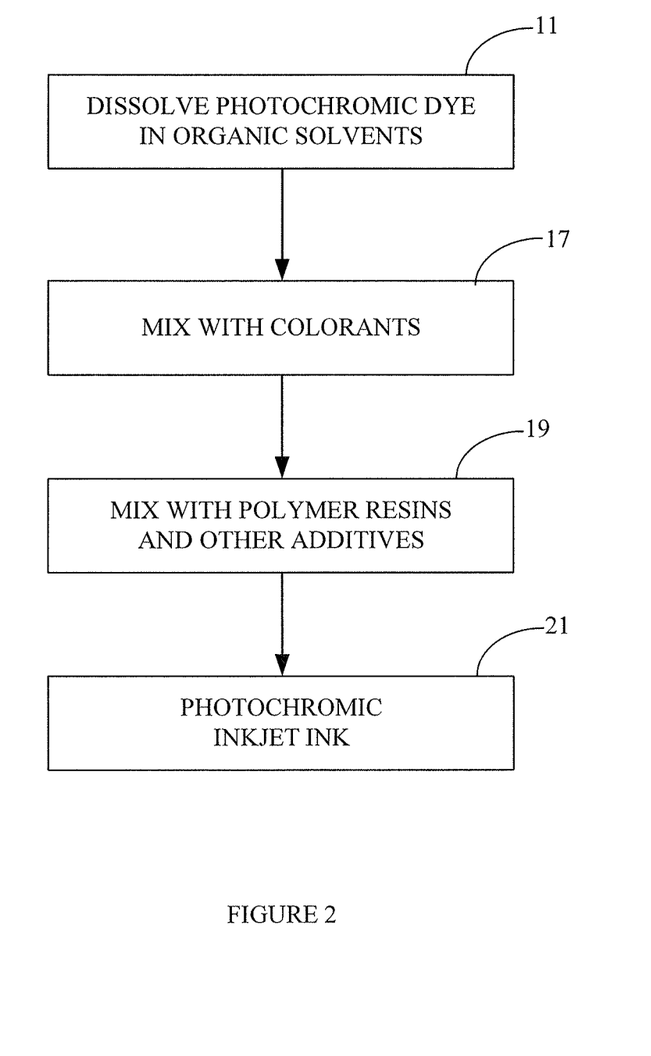
FIG. 2 is a block diagram of a process for making an alternate embodiment of photochromic inkjet ink according to the present invention.

FIG. 2 illustrates a preferred method of making a photochromic inkjet ink that is called an "overt" ink. The overt inkjet ink prints visible marks on a substrate in one color that changes to a different second color when exposed to sunlight or UV light, such as blacklight.

This overt inkjet ink is made by dissolving photochromic dye in organic solvents (11). A colorant (17) is mixed into the organic solvent solution containing the photochromic dye. These colorants may be solvent dyes or solvent-based pigment dispersions, for example. The resulting solution is mixed with polymer resins and other additives (19) to produce the overt photochromic inkjet ink (21).

A variety of organic solvents may be used in the formulation of the inkjet ink of the present invention. When considering the requirements of dye solubility, polymer resin solubility, ink stability and drying property of the ink on a chosen substrate, one or more of the following four organic solvents are preferred: ketone, alcohol, glycol ethers and esters.

An example of ketones that may be utilized are: acetone, methyl ethel ketone, methyl propyl ketone, methyl butyl ketone, cyclohexanone, cyclopentanone, cyclohephanone, cycloctanone and isophorene.

An example of the alcohols that may be used in the formulation of the present invention are: methanol, ethanol, propanol, butanol, pentanol and hexanol.

An example of the glycol ethers that may be used in the formulation of the present invention are: diethylene glycol diethyl ether, diethylene glycol monopropyl ether, propylene glycol butyl ether, dipropylene glycol butyl ether, dipropylene glycol monomethyl ether, dipropylene glycol dimethyl ether, propylene glycol propyl ether, tetraethylene glycol dimethyl ether, methyl butyl ether, tripropylene glycol methyl ether, tetrahydrofuran and tetrahydropyran.

An example of esters that may be used in the formulation of the present invention are: cyclic carboxylic esters, such as, for example, γ-Butyrolactone.

The preferred amount of photochromic material in inkjet ink ranges from about 0.1% to about 10% by weight for an overt ink composition. The preferred amount of colorant in the overt ink ranges from about 0.1% to about 5% by weight of the ink composition.

A critical component of the inkjet ink of the present invention is the polymer resin. The polymer resins are critical because they stabilize the optical characteristics of the photochromic inks.

Polymer resins that may be used in the present invention include: polyester (PET), polyethylene, acrylonitrile butadiene styrene (ABS), polyvinyl chloride (PVC), polystyrene, polyamides, polypropylene and polyurethane. In addition, vinyl chloride resin, vinyl acetate resin, acrylic block copolymer resin, low acid-value acrylic resin, and styrene acrylic resin have been found to be very effective in improving the stability of the optical characteristics of the photochromic inks of the present invention.

The preferred amount of polymer resins in the inkjet ink ranges from about 5% to about 20% by weight of the ink composition.

The photochromic inkjet ink formulations of the present invention can be printed on porous and non-porous substrates, such as, for example, plain paper, coated paper, Teslin, polymer film, ceramic material and metal.

An example of six inks made according to the present invention for printing on a porous substrate is illustrated in Table 1.

TABLE 1

| Ingredient | Ink 1 | Ink 2 | Ink 3 | Ink 4 | Ink 5 | Ink 6 |
|---|---|---|---|---|---|---|
| Photosol 7-114 (Blue) | 2% | | | | | |
| Photosol 7-49 (Red) | | 2% | | | | |
| Photosol 7-877 (blue) | | | 2% | | | |
| Photosol 5-83 (red) | | | | 2% | | |
| Photosol 7-3698 (purple) | | | | | 1% | |
| Photosol 7-250 (orange) | | | | | | 2% |
| Alcohol | 20% | 20% | 20% | 20% | 20% | 20% |
| Glycol ether | 2% | 2% | 2% | 2% | 2% | 2% |
| Surfactant | 0.3% | 0.3% | 0.3% | 0.3% | 0.3% | 0.3% |
| Polymer resin | 1.5% | 1.5% | 1.5% | 1.5% | 1.5% | 1.5% |
| Other additives | 2% | 2% | 2% | 2% | 2% | 2% |
| Ester, γ-Butyrolactone | Balance | Balance | Balance | Balance | Balance | Balance |

The six inks (1-6) illustrated in Table 1 print invisible marks on a porous substrate. The invisible marks will change to a visible color upon exposure to sunlight or UV light, such as blacklight, for example.

The six inks illustrated in Table 1 utilize a high percentage of non-volatile solvents such as alcohol, glycol ether and esters. These inks are most effective when printed on substrates, such as uncoated paper-based substrates, Teslin and other porous substrates. All of the formulations in Table 1 are environmentally friendly. All of the formulations in Table 1 cause invisible marks to be printed on the substrate. These printed marks change to a visible color immediately upon the substrate being exposed to sunlight or UV light, such as blacklight, for example. The printed marks retain their visible color for about 15 to 30 minutes after the sunlight or UV light exposure is removed. The visible marks will gradually revert to their initial invisible state in 10 to 30 minutes thereafter.

An example of six inks formulated for use on non-porous substrates is shown in Table 2.

TABLE 2

| Ingredient | Ink 7 | Ink 8 | Ink 9 | Ink 10 | Ink 11 | Ink 12 |
|---|---|---|---|---|---|---|
| Photosol 7-114 (Blue) | 2% | | | | | |
| Photosol 7-49 (Red) | | 2% | | | | |

TABLE 2-continued

| Ingredient | Ink 7 | Ink 8 | Ink 9 | Ink 10 | Ink 11 | Ink 12 |
|---|---|---|---|---|---|---|
| Photosol 7-877 (blue) | | | 2% | | | |
| Photosol 5-83 (red) | | | | 2% | | |
| Photosol 7-3698 (purple) | | | | | 1% | |
| Photosol 7-250 (orange) | | | | | | 2% |
| Alcohol | 20% | 20% | 20% | 20% | 20% | 20% |
| Ester | 8% | 8% | 8% | 8% | 8% | 8% |
| Glycol ether | 2% | 2% | 2% | 2% | 2% | 2% |
| Surfactant | 0.3% | 0.3% | 0.3% | 0.3% | 0.3% | 0.3% |
| Polymer resin | 1.5% | 1.5% | 1.5% | 1.5% | 1.5% | 1.5% |
| Other additives | 2% | 2% | 2% | 2% | 2% | 2% |
| Ketone | Balance | Balance | Balance | Balance | Balance | Balance |

The six inks (7-12) illustrated in Table 2 contain a high percentage of ketone solvents. The formulations illustrated in Table 2 are suitable for printing characters on semi-porous or non-porous substrates such as ceramic, plastic, polymer films and metal sheets, for example. The inks illustrated will print an invisible mark on the substrate. The invisible mark changes to a visible color immediately upon the substrate being exposed to sunlight or UV light, such as blacklight. After this light exposure is removed, the printed mark remains visible from 15 to 30 minutes. The visible mark gradually reverts back to its natural invisible state in 10 to 30 minutes thereafter.

Figure 3:
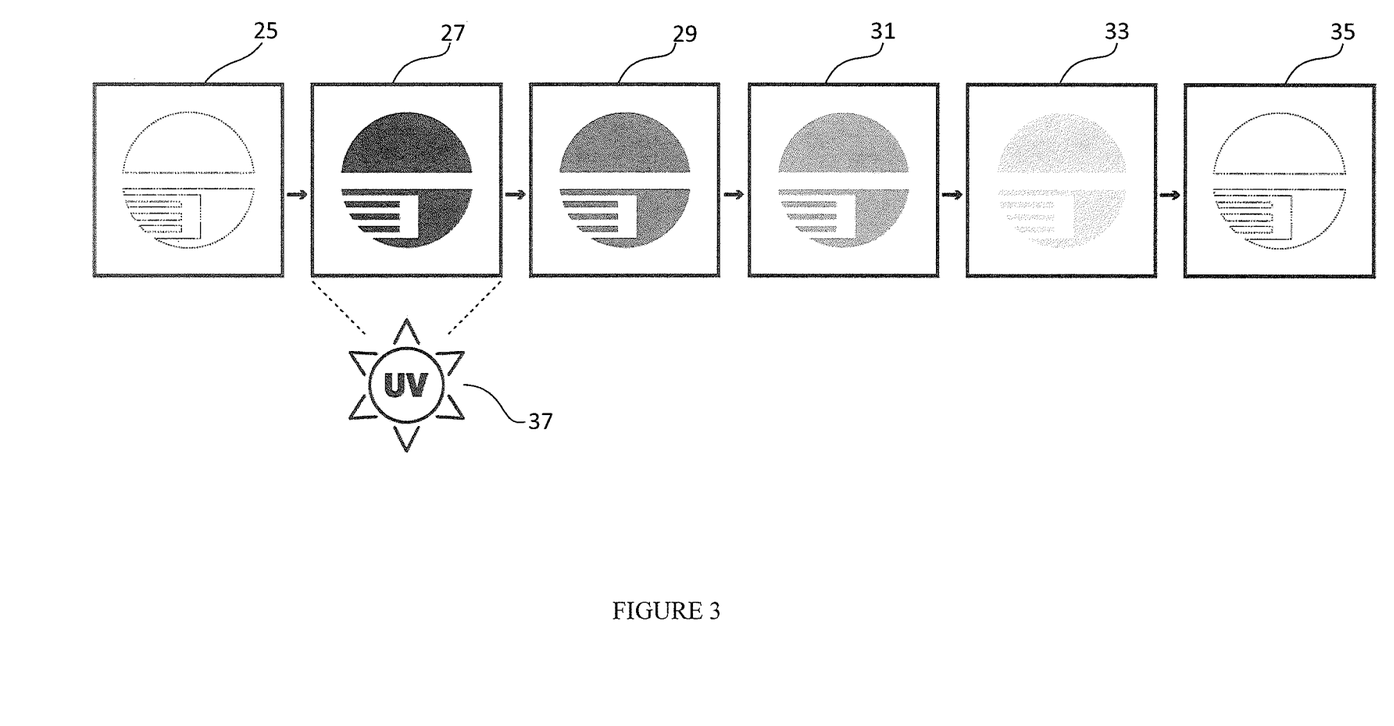
FIG. 3 is an illustration of an example of a transition cycle of the covert inkjet of the present invention.

FIG. 3 illustrates an example of a transition cycle for a covert inkjet ink according to the present invention. The example shows an original mark 25 printed to be invisible to the human eye. When the invisible mark is irradiated with a UV light 37, for example, the invisible mark will immediately change to a red mark 27, for example. Upon the UV radiation being removed, the red mark 28 transitions back to its original printer invisible mark.

After about five minutes without radiation, the red mark 27 fades to a light red mark 29. After about 10 minutes, it fades to a light red 31. After about 15 minutes, it fades to an even lighter red 33. After about 20 minutes, the mark fades completely 35 and is invisible to the eye again.

An example of six ink formulations (13-18) that are considered overt inks, in that they print a visible mark which changes color upon exposure to sunlight, is illustrated in Table 3.

TABLE 3

| Ingredient | Ink 13 | Ink 14 | Ink 15 | Ink 16 | Ink 17 | Ink 18 |
|---|---|---|---|---|---|---|
| Photosol 7-114 (blue) | 2% | | 2% | | 2% | |
| Photosol 7-49 (red) | | 2% | | 2% | | 2% |
| Savinyl Yellow RLS (SY 83:1) | 0.8% | 0.8% | | | | |
| Savinyl Blue GLS (SB 44) | | | 0.8% | 0.8% | | |
| Savinyl Red 3BLS (SR 91) | | | | | 0.8% | 0.8% |
| Alcohol | 20% | 20% | 20% | 20% | 20% | 20% |
| Acetate | 0.2% | 0.2% | 0.2% | 0.2% | 0.2% | 0.2% |
| Glycol ether | 0.5% | 0.5% | 0.5% | 0.5% | 0.5% | 0.5% |
| Surfactant | 0.3% | 0.3% | 0.3% | 0.3% | 0.3% | 0.3% |
| Polymer Resin | 1.5% | 1.5% | 1.5% | 1.5% | 1.5% | 1.5% |
| Other additives | 2% | 2% | 2% | 2% | 2% | 2% |
| Ester, γ-Butyrolactone | Balance | Balance | Balance | Balance | Balance | Balance |

The solvent dyes utilized in the inks shown in Table 3 provide a basic color for the initial printed mark, such as yellow, cyan or magenta.

The solvent dyes illustrated in Table 3 are preferably Savinyl solvent dyes that can be obtained from the Clariant Corporation of Switzerland. When the printed substrates are exposed to sunlight or to UV light such as blacklight, the colors of the each of the inks (13-18) will change in color.

Examples of how the marks change color are illustrated in Table 4.

TABLE 4

| Ink | Original color | Color changes to |
|---|---|---|
| 13 | Yellow | Purple |
| 14 | Yellow | Orange |
| 15 | Cyan | Dark blue |
| 16 | Cyan | Dark brown |
| 17 | Magenta | Brown |
| 18 | Magenta | Red |

As shown in Table 4, ink 13, for example, prints a mark in yellow. Upon being exposed to sunlight, the mark will change to purple. Ink 17, on the other hand, prints a mark in the magenta. Upon being exposed to sunlight, the mark will change to brown.

The changed colors will gradually revert back to their original colors in 10 to 30 minutes after exposure to sunlight or UV light is removed.

Figure 4:
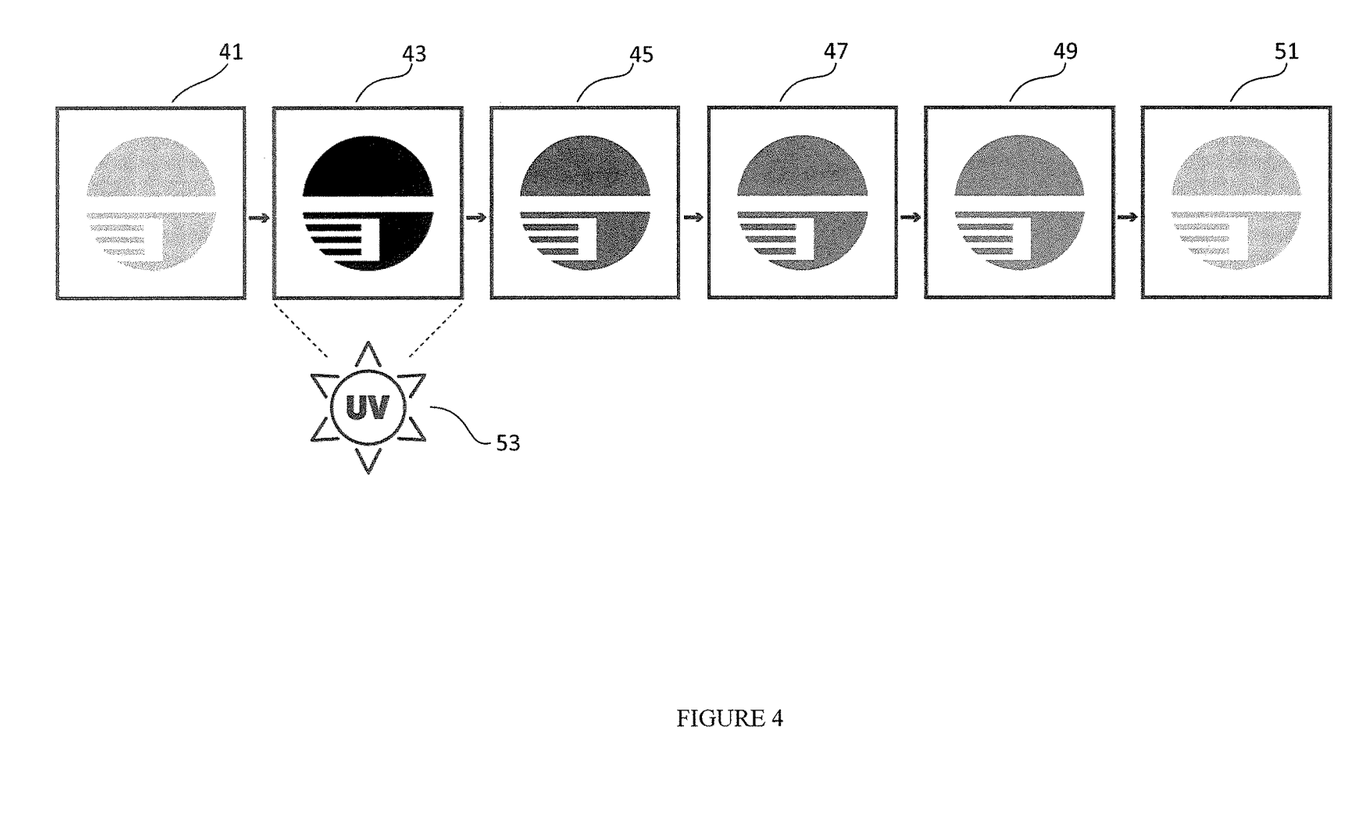
FIG. 4 is an illustration of an example of a transition cycle of the overt inkjet ink of the present invention.

FIG. 4 illustrates an example of a transition cycle for an overt inkjet ink according to the present invention. The example shows an original mark 41 printed in yellow, for example. When the printed visible yellow mark is irradiated by a UV light 53, for example, the mark will immediately change to a color purple 43, for example.

Upon the UV radiation being removed, the color of mark 43 transitions back to its original printed yellow color.

After about five minutes without radiation, the color of the printed mark fades to a light green 45. After about 10 minutes, it fades to a light green 47. After about 15 minutes, it fades to an even lighter green 49. After about 20 minutes, it fades back to yellow 51.

It has been found that the use of certain types of polymer resins in certain quantities greatly enhances the ability of the inkjet inks to maintain their photochromic characteristics over time, or in the face of environmental conditions such as heat or long-time exposure to UV light.

An example of six ink formulations (19-23) which illustrate this stability is shown in Table 5. Each of the ink formulations in Table 5 print an invisible mark on a substrate. The invisible mark becomes a visible mark of a certain color when exposed to sunlight or UV light.

TABLE 5

| Ingredient | Ink 19 | Ink 20 | Ink 21 | Ink 22 | Ink 23 |
|---|---|---|---|---|---|
| Photosol 7-250 (orange) | 3% | 3% | 3% | 3% | 3% |
| Alcohol | 20% | 20% | 20% | 20% | 20% |
| Acetate | 0.2% | 0.2% | 0.2% | 0.2% | 0.2% |
| Glycol ether | 0.5% | 0.5% | 0.5% | 0.5% | 0.5% |
| Vinyl chloride/vinyl acetate resin | | 10.0% | | | |
| Acrylic block copolymer resin | | | 10% | | |
| low acid-value acrylic resin | | | | 10% | |
| Styrene acrylic resin | | | | | 10% |
| Surfactant | 0.3% | 0.3% | 0.3% | 0.3% | 0.3% |
| Other additives | 2% | 2% | 2% | 2% | 2% |
| Ester, γ-Butyrolactone | Balance | Balance | Balance | Balance | Balance |

Ink 19 of Table 5 is formulated without a resin. Inks 20-23 of Table 5 each use an extensive amount of polymer resins.

As shown in Table 6, ink 19 of Table 5 exhibited slight fading of its photochromic characteristics (optical feature) after 30 days and serious fading of its photochromic characteristics (optical feature) after six months.

TABLE 6

| Ink | Optical feature faded after 30 days | Optical feature faded after 6 months |
|---|---|---|
| Ink 19 | Faded slightly | Faded seriously |
| Ink 20 | Did not fade | Did not fade |
| Ink 21 | Faded slightly | Faded moderately |
| Ink 22 | Faded slightly | Faded slightly |
| Ink 23 | Faded slightly | Faded moderately |

Inks 19-23 of Table 5, on the other hand, which use a polymer resin at about 10% by weight, show considerable stability of the photochromic characteristics. Ink 20 of Table 5, as shown in Table 6, had no fade after 30 days and no fade after six months. Inks 21-23 of Table 5 showed slight fade after 30 days and moderate or slight fade after six months.

This illustrates that the use, and type of polymer resin used is of considerable importance. The vinyl chloride/vinyl acetate resin used in ink 20, which is preferable, is Efka PX 4710, which can be obtained from BASF SE Performance Additives of Ludwigshafen, Germany. The acrylic block copolymer resin is preferably VINNOL® E18/38, which can be obtained from Wacker Chemie AG of Munchen, Germany. The low acid-value acrylic resin is preferably Joncryl 683, obtainable from BASF Corporation of Southfield, Michigan. The styrene acrylic resin is preferably Joncryl HPD 671 obtainable from BASC Corporation of Southfield, Michigan.

The preferred levels of polymer resins used in the inks of Table 5 are from about 5% by weight to about 20% by weight of the inkjet ink formulation.

The foregoing disclosure describes preferred embodiments of the invention. Numerous modifications may be made therein without the departing from the spirit or the scope of the invention, as set forth in the appended claims. It is therefore to be understood that, within the scope of the appended claims, the invention may be practiced otherwise than specifically described.

What is claimed is:

1. A method of making a photochromic inkjet ink for printing invisible marks on a porous substrate with an inkjet printer, the printed marks changing to a visible color upon exposure to sunlight or UV light, the method comprising:
    dissolving a photochromic dye, from 0.1% to 10% by weight of the ink composition, in a non-volatile organic solvent;
    mixing a polymer resin, from 1% to 10% by weight of the ink composition, into the non-volatile organic solvent containing the photochromic dye; and
    mixing surface modifying agents and additives into the non-volatile organic solvent containing the photochromic dye and polymer resin, and
    wherein the photochromic inkjet ink is configured to be printed by the inkjet printer and includes the mixture of the surface modifying agents and additives with the non-volatile organic solvent containing the photochromic dye and polymer resin.

2. The method of claim 1 wherein the photochromic dye is one of Photosol 7-114, Photosol 7-49, Photosol 7-877, Photosol 5-83, Photosol 7-3698, and Photosol 7-250.

3. The method of claim 1 wherein the photochromic dye is from 1% to 3% by weight of the ink composition.

4. The method of claim 1 wherein the non-volatile organic solvent is one or more of alcohol, ketone, glycol ether and an ester.

5. The method of claim 4 wherein the alcohol is at 20% by weight of the ink composition.

6. The method of claim 5 wherein the glycol ether is at 2% by weight of the ink composition.

7. The method of claim 6 wherein the ester is at 72% by weight of the ink composition.

8. The method of claim 7 wherein the ester is γ-Butyrolactone.

9. The method of claim 5 wherein the alcohol is one of methanol, ethanol, propanol, butanol, and hexanol.

10. The method of claim 4 wherein the ketone is one of acetone, methyl ethyl ketone, methyl propyl ketone, methyl butyl ketone, cyclohexanone, cyclopentanone, cyclohephanone, cycloctanone and isophorene.

11. The method of claim 4 wherein the glycol ether is one of diethylene glycol diethyl ether, diethylene glycol monopropyl ether, propylene glycol butyl ether, dipropylene glycol butyl ether, dipropylene glycol monomethyl ether, dipropylene glycol dimethyl ether, propylene glycol propyl ether, tetraethylene glycol dimethyl ether, methyl butyl ether, tripropylene glycol methyl ether, tetrahydrofuran and tetrahydropyran.

12. The method of claim 4 wherein the ester is a cyclic carboxylic ester.

13. The method of claim 1 wherein the surface modifying agents are a surfactant at 0.3% by weight of the ink composition.

14. The method of claim 1 wherein the polymer resin is one of polyester (PET), polyethylene, acrylonitrile butadiene styrene (ABS), polyvinyl chloride (PVC), polystyrene, polyamides, polypropylene, polyurethane resin, vinyl chloride/vinyl acetate, acrylic block copolymer, low acid-value acrylic, and styrene acrylic resin.

15. The method of claim 14 wherein the polymer resin is present at 1.5% by weight of the ink composition.

16. A method of making a photochromic inkjet ink for printing invisible marks on a non-porous substrate with an inkjet printer, the printed marks changing to a visible color upon exposure to sunlight or UV light, the method comprising:
dissolving a photochromic dye, from 0.1% to 10% by weight of the ink composition, in a non-volatile organic solvent;
mixing a polymer resin from 1% to 10% by weight of the ink composition into the non-volatile organic solvent containing the photochromic dye;
mixing surface modifying agents and additives into the non-volatile organic solvent containing the photochromic dye and polymer resin;
adding ketone from 70% to 96% by weight of the ink composition, and
wherein the photochromic inkjet ink is configured to be printed by the inkjet printer and includes the ketone and the mixture of the surface modifying agents and additives with the non-volatile organic solvent containing the photochromic dye and polymer resin.

17. The method of claim 16 wherein the non-volatile organic solid is one or more of alcohol, glycol ether and an ester.

18. The method of claim 17 wherein the alcohol is at 20% by weight of the ink composition.

19. The method of claim 18 wherein the glycol ether is at 2% by weight of the ink composition.

20. The method of claim 19 wherein the ester is at 8% by weight of the ink composition.

21. The method of claim 16 wherein the ketone is one of acetone, methyl ethyl ketone, methyl propyl ketone, methyl butyl ketone, cyclohexanone, cyclopentanone, cycloheptanone, cyclooctenone and isophorone.

22. A method of making a photochromic inkjet ink for printing visible marks having a first color on a substrate with an inkjet printer, the printed marks changing to a second color, different from the first color, upon exposure to sunlight or UV light, the method comprising:
dissolving a photochromic dye, at 0.1% to 10% by weight of the ink composition, in a non-volatile organic solvent;
dissolving a colorant, at 0.1% to 5% by weight of the ink composition, in the non-volatile organic solvent containing the photochromic dye;
mixing a polymer resin, at 1% to 10% by weight of the ink composition, into the non-volatile organic solvent containing the polychromatic dye and colorant, and
wherein the photochromic inkjet ink is configured to be printed by the inkjet printer and includes the mixture of the polymer resin with the non-volatile organic solvent containing the polychromatic dye and colorant.

23. The method of claim 22 wherein the photochromic dye is one of Photosol 7-114 and Photosol 7-49.

24. The method of claim 23 wherein the colorant is one of Savinyl Yellow RLS, Savinyl Blue GLS, and Savinyl Red 3BLS.

25. A photochromic inkjet ink formulation that prints an invisible mark on a substrate and changes to a visible color mark upon exposure to sunlight or UV light, the formulation comprising:
a photochromic dye at about 2% by weight of the ink formulation;
alcohol at about 20% by weight of the ink formulation;
glycol ether at about 2% by weight of the ink formulation;
polymer resin at about 1.5% by weight of the ink formulation;
surfactant at about 0.3% by weight of the ink formulation; and
an ester at about 75% by weight of the ink formulation, and
wherein the ink formulation is for printing by an inkjet printer.

26. A photochromic inkjet ink formulation that prints an invisible mark on a substrate and changes to a visible color mark upon exposure to sunlight or UV light, the formulation comprising:
a photochromic dye at about 2% by weight of the ink formulation;
alcohol at about 20% by weight of the ink formulation;
ester at about 8% by weight of the ink formulation;
glycol ether at about 2% by weight of the ink formulation;
polymer resin at about 1.5% by weight of the ink formulation;
surfactant at about 0.3% by weight of the ink formulation; and
ketone at about 66% by weight of the ink formulation, and
wherein the ink formulation is for printing by an inkjet printer.

27. A photochromic inkjet ink formulation that prints a visible mark of a first color on a substrate and changes to a second different color upon exposure to sunlight or UV light, the formulation comprising:
a photochromic dye at about 2% by weight of the ink formulation;
a colorant at about 0.8% by weight of the ink formulation;
alcohol at about 20% by weight of the ink formulation;
acetate at about 0.2% by weight of the ink formulation;
glycol ether at about 0.5% by weight of the ink formulation;
surfactant at about 0.3% by weight of the ink formulation;
polymer resin at about 1.5% of weight of the ink formulation; and
an ester at about 73% by weight of the ink formulation, and
wherein the ink formulation is for printing by an inkjet printer.

28. A photochromic inkjet ink formulation that prints an invisible mark on a substrate and changes to a visible mark upon exposure to sunlight or UV light, the formulation comprising:
a photochromic dye at about 3% by weight of the ink formulation;
alcohol at about 20% by weight of the ink formulation;
vinyl chloride or vinyl acetate resin at about 10% by weight of the ink formulation;
acetate at about 2% by weight of the ink formulation;
glycol ether at about 0.5% of the ink formulation;
surfactant at about 0.3% of the ink formulation; and
an ester at about 64% of the ink formulation, and
wherein the ink formulation is for printing by an inkjet printer.

29. The inkjet ink of claim 27 wherein the polymer resin is one of polyester (PET), polyethylene, acrylonitrile butadiene styrene (ABS), polyvinyl chloride (PVC), polystyrene, polyamides, polypropylene, polyurethane, vinyl chloride/vinyl acetate, acrylic block copolymer, low acid-value acrylic, and styrene acrylic resin.

* * * * *